Patented Nov. 24, 1953

2,660,566

UNITED STATES PATENT OFFICE 2,660,566

ELECTROLUMINESCENT ZINC SULFIDE PHOSPHOR

Herman C. Froelich, Cleveland Heights, Ohio, assignor to General Electric Company, a corporation of New York No Drawing. Application August 29, 1952, Serial No. 307,176

5 Claims. (Cl. 252—301.6)

My invention relates generally to luminescent materials or phosphors, and more particularly to copper-activated zinc sulphide phosphors and methods of preparation thereof.

It is an object of my invention to provide a copper-activated zinc sulphide phosphor which emits an appreciable amount of red radiation under A. C. field excitation.

In accordance with one aspect of my invention, I have discovered that such a phosphor may be prepared by firing materials having an unusually high copper content in an atmosphere of pure hydrogen sulphide at a temperature of approximately 1100° C.

A typical phosphor may be prepared by adding 0.5% Cu to pure ZnS, the copper being in the form of a copper salt such as a copper nitrate solution of such strength as to make a paste with the ZnS, drying the product, screening it and then firing it in an atmosphere of $H_2S$ at 1100° C. for from ½ to 1 hour. For example, 10 grams of pure ZnS may be moistened with a solution of .19 gram $Cu(NO_3)_2 \times 3H_2O$ in 7 cc. of water and processed as described. After cooling in $H_2S$, followed by slight crushing and sieving of the product through an 80 mesh screen, the phosphor is preferably washed with a tepid solution of a cyanide such as sodium cyanide (NaCN), followed by a water wash, drying and sieving through a 200 mesh screen.

The red electroluminescence response may be obtained over a range of concentrations of .01% to 1.0% added copper by weight of the ZnS. Maximum brightness was obtained with about .5% copper. The amounts of added copper are in excess of the amount of $Cu_2S$ which is soluble in ZnS. Most of the added copper is removed in the washing step with NaCN. After removal of the excess $Cu_2S$ the phosphors retain of the order of .01% to .1% Cu, either in true solid solution or in some other as yet unidentified association with the host lattice.

When made into an electroluminescent cell as a suspension in oil, such as castor oil, the phosphor gives orange to pink or red light, increasing in brightness with the applied voltage. Upon observation through a number of colored filters with sharp cut-offs, the emitted light is seen to consist of several bands including a blue band, a weaker green band, and a strong orange-red band. Unlike the known electroluminescent ZnS-ZnO:Cu phosphors, the phosphors prepared in accordance with my invention do not turn blue when the frequency of the applied field is raised from 100 to 500, 1000, 5000, 10,000 and 15,000 cycles per second. On the contrary, the intensity of the red band increases relative to the blue and green bands, such that the phosphors become not only brighter but redder at the higher frequencies. With the aid of a red filter such as Wratten No. 29, a strong pure red electroluminescent emission can be obtained at 500 to 5000 cycles and 300 volts. Without the filter, the color of light under these conditions of excitation may be described as pink or lavender, showing that the intensity of the blue band is stronger than that of the green band.

The phosphors respond weakly to 2537 Å excitation, and considerably stronger to 3650 Å, especially over the range of .05% to 1.0% added Cu. The brightest 3650 Å response was observed with .1% added Cu. The phosphors also show strong stimulability with infrared radiation after the 3650 Å excitation. The emitted color in all cases is orange-red. Brightest stimulation was obtained with copper contents from .01% to .1% added Cu. A phosphor with .01% Cu gave a weak blue fluorescence and phosphorescence after 3650 Å excitation, but a good orange light with infrared. The stimulability of the other compositions is of interest because, due to the absence of normal phosphorescence, there need be no waiting period to apply infrared. On the other hand, the stored energy is not expelled in the dark at room temperature for a period of hours.

It is to be noted that in all these cases the concentration of copper activator is considerably higher than in previously known zinc sulphide phosphors. In fact, zinc sulphide phosphors prepared in conventional manner with such high copper concentrations are only feebly, if at all, fluorescent, due to concentration quenching by the activator.

With the aid of a phototube cooled to the temperature of liquid air to reduce background noise, there were obtained recorded emission curves of the phosphor under 3650 Å and under electroluminescent excitation. Under the long ultraviolet excitation the presence of a blue, a yellow-orange, and a red band is clearly indicated while the exact position of the green band is obscured by the neighboring bands although its presence must be surmised from the general shape of the curve. Under electroluminescent excitation the same four bands are obtained as with ultraviolet excitation but their relative intensities vary. The blue band lies at about 4500 Å, the green band at about 5200 Å, the yellow-orange band at 5700 Å and the red band at about 6300 Å. When cooled to low temperature the blue emission of the phosphor occurs at a slightly lower wavelength peak, the green and yellow bands merely decrease in intensity while the red band remains prominent with a shift of peak emission toward longer wavelengths (to 6700 Å).

The intensity of the orange-red emission of the phosphor is affected by such factors as temperature and length of firing and the purity of the $H_2S$ gas used. I have found that the highest intensity of orange-red emission was obtained when 10 gram lots were fired at 1100° C. for one hour. With a firing time of ½ hour the color was more pink due to relatively higher intensity of the blue band; with a two hour firing the color was the same as with one hour firing but the over-all intensity was slightly lower. At higher temperatures, such as 1200° C., the same orange-red emission is obtained, but the phosphors turn out somewhat coarser. At lower temperatures, such as 1000° or less, the luminescence is substantially only blue or green, the intensity of the long wavelength bands being very low. The $H_2S$ gas must be free of oxidic or halide contaminants such as air, water, $CO_2$, HCl, etc. If the latter are present even in very low concentration, a weak luminescence is obtained only in the blue and green bands, and not in the orange or red, under either ultraviolet or A. C. field excitation. Impurities such as $CO_2$ or $SO_2$ may be removed, for example, by bubbling the $H_2S$ through a solution of $Ba(OH)_2$ and drying it in a cold trap held at about −57° C. At this temperature water vapor is frozen out down to amounts which do not interfere with the development of the orange-red luminescence. Since activating impurities in the raw materials and in the $H_2S$ firing gas have been eliminated as a possible source for the red emission, and since the amount of retained copper is of the same order of magnitude as in the conventional, green-emitting ZnS–ZnO:Cu phosphors, the conclusion must be drawn that the red emission is due to copper in the absence of oxide and halide in the red zinc sulphide phosphors. This is a new and readily reproducible property of ZnS:Cu phosphors in accordance with my invention.

The red emission is apparently obtainable only when the phosphors are fired at temperatures such as 1100° C. which favor the development of the hexagonal structure of ZnS, and when the amount of sulphur in the phosphor is neither too low nor too high with respect to stoichiometric proportions. This was demonstrated by firing the phosphor either in vacuo (where a deficiency of S is likely to result) or in an atmosphere of sulphur vapor (where an excess of S is likely to result). In both cases the electroluminescent response was blue instead of red, as in the case of ZnS–ZnO:Cu phosphors fired under these conditions. The atmosphere of pure $H_2S$ appears to provide the proper balance of sulphur concentration to give the red emission of ZnS:Cu phosphors.

I have also found, as might be expected from the above, that the red emission may be obtained by firing in an atmosphere of $N_2+CS_2$. However, the electrical resistance of this phosphor was comparatively low, such that an electroluminescent response was obtained only with an additional layer of insulator material in the electroluminescent cell. The low resistance of the phosphor is probably due to the presence of carbon or elemental zinc formed in side reactions with $CS_2$.

What I claim as new and desire to secure by Letters Patent of the United States is:

1. The method of preparing a copper-activated zinc sulphide phosphor having an orange-red emission which comprises firing zinc sulphide in admixture with about .01% to 1.0% by weight of copper at a temperature of approximately 1100° C. in an atmosphere of hydrogen sulphide.

2. The method of preparing a copper-activated zinc sulphide phosphor having an orange-red emission which comprises firing zinc sulphide in admixture with about .5% by weight of copper at a temperature of approximately 1100° C. in an atmosphere of hydrogen sulphide.

3. The method of preparing a copper-activated zinc sulphide phosphor having an orange-red emission which comprises firing zinc sulphide in admixture with about .01% to 1.0% by weight of copper at a temperature of approximately 1100° C. in an atmosphere of hydrogen sulphide, and removing excess copper sulphide by washing the phosphor in a cyanide solution.

4. A copper-activated zinc sulphide phosphor characterized by orange-red emission induced by firing a mixture of zinc sulphide and about .01% to 1% by weight of copper at a temperature of approximately 1100° C. in an atmosphere of hydrogen sulphide.

5. A copper-activated zinc sulphide phosphor characterized by orange-red emission induced by firing a mixture of zinc sulphide and about .01% to 1% by weight of copper at a temperature of approximately 1100° C. in an atmosphere of hydrogen sulphide, and by removal of excess copper sulphide by washing the phosphor in a cyanide solution.

HERMAN C. FROELICH.

References Cited in the file of this patent

UNITED STATES PATENTS

| Number | Name | Date |
| --- | --- | --- |
| 2,218,750 | Hinderer | Oct. 22, 1940 |
| 2,531,618 | Geoghegan | Nov. 28, 1950 |
| 2,624,857 | Mager | Jan. 6, 1953 |

FOREIGN PATENTS

| Number | Country | Date |
| --- | --- | --- |
| 496,085 | Great Britain | Nov. 24, 1938 |
| 873,860 | France | July 22, 1942 |
| 544,118 | Germany | Feb. 15, 1932 |